2,793,097
METHOD OF PRODUCING ALKALI METAL TITANIUM FLUORIDES IN WHICH THE TITANIUM HAS A VALENCE OF LESS THAN FOUR

Quentin H. McKenna, Cleveland, Ohio, assignor, by mesne assignments, to Horizons Titanium Corporation, Princeton, N. J., a corporation of New Jersey No Drawing. Application September 14, 1955,
Serial No. 534,403
5 Claims. (Cl. 23—88)

This invention relates to the preparation of complex alkali metal-titanium-fluorine compounds in which the titanium has a valence of less than four.

Titanium halides, in which the titanium is divalent or trivalent, are becoming increasingly useful for the production of titanium metal by thermal or electrolytic processes and as a result, such compounds are of potentially great commercial importance. Various procedures have been suggested for preparing lower valent titanium-alkali metal fluorides, including one described in a co-pending application, Serial No. 455,068, filed September 9, 1954, now United States Patent 2,723,182, which issued November 8, 1955 to Merle E. Sibert and the present applicant. In that application, there is described a process for preparing the desired compounds by a simple thermal reaction between any of the oxides of titanium, carbon and an alkali metal fluotitanate. According to the process therein disclosed, a mixture of the reactants is heated to a temperature within the range of about 780° C. to about 1150° C. under an inert atmosphere, whereby an alkali metal-titanium double fluoride is formed in which the titanium has a valence of less than four.

I have now found that it is possible to prepare lower valent titanium fluorides directly from alkali metal fluotitanates in which the titanium is tetravalent by a simple thermal reaction between said fluotitanates and an oxidic titanium material. The instant process differs principally from the process disclosed in the above identified application, in that it may be effected in the absence of carbon. In the present process an oxide of titanium is reacted with an alkali metal fluotitanate such as sodium, potassium or lithium fluotitanate by heating the reactants to a suitable temperature under an atmosphere which is inert with respect to said reactants. The desired reaction may be effected between reactants in the solid state, by operating at temperatures below the melting point of any of the reactants. I prefer, to carry out the reaction at a temperature sufficiently elevated to insure that at least one of the reactants, usually the fluotitanate, is in molten form. This is particularly advantageous in modifications of my process in which an alkali metal halide, usually the chloride, is present in the reaction mixture as a diluent salt. In such processes the reaction is effected in a molten salt environment with many accompanying advantages, particularly when one or more of the reactants dissolves in the diluent salt bath. Regardless of the reactants employed, one of the products formed as a result of the reaction is an alkali metal-titanium double fluoride in which the titanium has a valence less than four. This product may be recovered from the reaction residue either by aqueous separation or in the form of a molten bath containing the reduced valence compound.

The alkali metal fluotitanates useful in the practice of my invention include sodium fluotitanate, potassium fluotitanate and lithium fluotitanate. In order to avoid undesirable side reactions and possible contamination of the product the fluotitanate employed should be of re-crystallized quality. That is to say, the fluotitanate should be substantially free of silica and metallic impurities and should contain less than about .01% water and .01% insolubles. Because of the relative cheapness and availability of potassium fluotitanate, I presently prefer to use this fluotitanate in my process. Therefore, in the interest of simplicity, the invention will be described in connection with the use of potassium fluotitanate as a representative of all metal alkali fluotitanates. However, it should be kept in mind that what is said with respect to potassium fluotitanate applies equally to the other alkali metal fluotitanates.

The second reactant in my process is an oxygen containing titanium material, such as one of the oxides of titanium. The oxides I have successfully employed include titanium sesquioxide and titanium monoxide, and other oxides in which the titanium has a valence less than four would appear to be equally suitable. Whatever the oxygen containing titanium material chosen for reaction, it should be very finely divided. Oxides in the form of particles of about minus 325 mesh (Tyler Standard) are preferred, and should be as free as possible from elements other than titanium and oxygen. Silica and metallic impurities which dissolve in potassium fluotitanate, are particularly objectionable in carrying out my process. The preparation of other oxides of suitable purity are described in U. S. Patents 2,681,849, 2,681,850 and 2,681,851.

The reaction between the titanium oxide and the potassium fluotitanate is effected by heating the reactants together in an atmosphere which is inert with respect to the reactants to an elevated temperature below that at which the resulting lower valent complex titanium products decompose or disproportionate. The reaction will proceed to some extent at temperatures well below the melting point of pure potassium fluotitanate (772° C.) and is accelerated with increasing temperature. At temperatures of about 1200° C. or higher, excessive decomposition and disproportionation occur. Accordingly, a temperature within the range of about 700° C. to about 1150° C. and preferably within the range of about 780° to 1100° C. is preferred in the practice of my invention. Within this range temperatures between about 780° C. and 900° C. promote the formation of a product in which the titanium is trivalent while temperatures above 900° C. favor the formation of products in which the titanium is divalent.

I have observed that if a melt of sodium chloride is prepared by heating the pure salt in a suitable container and either a suitable oxide of titanium or in alkali metal fluotitanate is added to the molten salt, it dissolves gradually, on continued heating without any apparent reaction. However, when both the oxide of titanium and the alkali metal fluotitanate are added to a fused melt of sodium chloride, or when one is added to a salt melt containing the other, a vigorous effervescence accompanies the gradual disappearance of the added solids and on continued heating, the clear or water white melt is observed to acquire a tint varying from salmon pink to violet, depending on the relative proportions of the constituents and the reaction conditions. While I do not wish to be bound by any particular theory, it my belief that a reaction between the oxygen containing titanium compound and the alkali-metal fluotitanate may occur along one or more of the following lines:

1. $2Ti_2O_3 + 12K_2TiF_6 \rightarrow 16KTiF_4 + 8KF + 3O_2$
2. $2TiO + 6K_2TiF_6 \rightarrow 8KTiF_4 + 4KF + O_2$
3. $2Ti_2O_3 + 8K_2TiF_6 \rightarrow 8KTiF_4 + 4KTiF_3 + 4KF + 3O_2$
4. $2TiO + 4K_2TiF_6 \rightarrow 4KTiF_4 + 2KTiF_3 + 2KF + O_2$
5. $2Ti_2O_3 + 14K_2TiF_6 \rightarrow 18KTiF_4 + 10KF + 3O_2 + F_2$
6. $2TiO + 8K_2TiF_6 \rightarrow 10KTiF_4 + 6KF + O_2 + F_2$
7. $2Ti_2O_3 + 12K_2TiF_6 \rightarrow 16KTiF_3 + 8KF + 3O_2 + 8F_2$
8. $2TiO + 6K_2TiF_6 \rightarrow 8KTiF_3 + 4KF + O_2 + 4F_2$ The reactions postulated in Equations 1, 2, 5 and 6 are favored by lower temperatures while those of Equations 3, 4, 7 and 8 are favored by higher temperatures. It is also considered possible that a simple or complex oxyfluoride may form which, under the conditions of the system, decomposes to yield oxygen and fluorine. I have observed, in addition to the effervescent bubbling of the reactants, that a pungent gas with many of the characteristics of fluorine is evolved from the reaction mass.

In order for the reaction to proceed efficiently, it is preferable that the oxygen containing titanium material and the alkali metal fluotitanate should intimately contact each other. To this end, they are provided in finely divided form and are brought together in a suitable reaction vessel. The reaction vessel is advantageously a graphite crucible or some similar container that is inert to the reactants at the temperatures encountered in the process. The reactants may be premixed in any desired proportions and added in solid form to the reaction vessel; or the lower melting reactant, the fluotitanate, may be melted and then the oxide added to the melt; or, in cases where a fused carrier salt is employed, a melt of one or more alkali metal halides may be prepared in the vessel and the reactants added thereto. Regardless of the manner of charging, it is necessary that the reaction be conducted under an inert atmosphere.

Any suitable furnace may be used for carrying out my process, provided it is constructed so that an inert atmosphere can be maintained in the furnace. One such furnace, as described in the earlier filed application, comprises a steel pot having an open top which can be sealed with a gas tight lid. Advantageously the steel pot is internally insulated with a refractory silicious powder held in place against the walls of the pot by means of a graphite liner. An internal heating element is provided, advantageously comprising a graphite resistance element adapted to surround the graphite reaction vessel. The graphite reaction vessel containing the reactants is disposed within the graphite resistance element which, in turn, is centrally positioned in the insulated pot. The necessary electrical connections to the heating element, and the necessary valves and inlet and outlet pipes for the establishment of the inert atmosphere within the furnace, are provided in the gastight lid of the steel pot.

To establish an inert atmosphere in the furnace, I presently prefer first to evacuate all of the air from within the furnace, and then to introduce dry argon gas into the furnace, repeating the cycle of evacuation of the atmosphere and replacement with argon gas at least two times. After flushing out the interior of the furnace in this manner, a flow of dry pure argon gas into and out of the furnace is established in order to sweep from the atmosphere in the furnace any gaseous products evolved from the reactants in the course of the reaction.

The reactants are heated in an inert atmosphere. A furnace such as that described is used to bring the reactants up to a reaction temperature within the range of about 700° to 1150° C. The reactants are held at this reaction temperature for a period of time sufficient to insure that the reaction has gone as close to theoretical completion as the reaction conditions permit. The time required for substantial completion of the reaction depends upon the intimacy of contact if the reactants are in the solid state as well as upon the temperature of the reactants. A reaction time of from five to ten hours is usually sufficient for either solid state or fused salt reaction to be completed.

On completion of the reaction, the furnace is allowed to cool and the solidified salt cake is recovered from the crucible removed therefrom. The solidified salt cake recovered from the crucible is reddish brown to greyish lavender in color and may contain, besides the lower valent titanium fluorides produced by the reaction, any unreacted titanium oxide or titanium scrap, unreduced normal potassium fluotitanate, diluent alkali metal chlorides and any oxyfluorides that may have formed and not have decomposed in the course of the reaction. The lower valent titanium fluoride product can be recovered from the reaction residue by wet chemical treatment or by filtration of the molten salt mass to remove insolubles.

The recovery of the lower valent titanium product by aqueous procedures is limited in practice to trivalent titanium fluorides. The product salt cake is first crushed to a fine powder and then is leached with cold dilute hydrochloric acid to dissolve the complex potassium salts of lower valent titanium fluorides which are soluble therein, leaving undissolved any residual titanium oxide, potassium fluotitanate and oxyfluorides. A clear green liquor (characteristic of trivalent titanium solutions) is obtained as the result of the leaching operation, and this liquor is thereupon filtered to remove all insoluble matter. A saturated solution of sodium fluoride is added to the green filtrate while stirring the filtrate until the color changes permanently from green to brownish violet. The solution is then warmed gently, (i. e. to a temperature of about 40° to 50° C.), whereupon tannish lavender crystals precipitate out of the solution leaving a violet colored supernatant liquid. The precipitated crystals are recovered by filtering the liquid, and the violet filtrate is again treated with a saturated solution of sodium fluoride. Upon addition of the sodium fluoride solution with stirring, the violet solution gradually becomes substantially colorless at which point a slight turbidity develops. Gentle warming causes tannish violet colored crystals to precipitate from the solution leaving a water white supernatant liquid. The second batch of precipitated crystals are recovered by filtration and both batches are then washed with distilled water and dried at 105° C.

Although the exact structures of the complex lower valent titanium fluorides are not known with certainty, it has been found that the sodium fluoride derivatives obained as the first and second precipitates from the green liquor have completely different X-ray patterns, apparently indicative of different sodium fluoride and potassium fluoride contents. However, irrespective of their precise structure, the lower valent titanium fluoride products obtained by the practice of our invention are free from potassium fluotitanate, and normal sodium and potassium fluorides and chlorides. These reduced titanium products are therefore available for subsequent use in a highly pure state.

When the lower valent titanium fluoride product is recovered by filtration of the fused reaction residue, the fused salt mass is filtered through a porous graphite or carbon filter, thus separating the molten salt from any residual titanium scrap, titanium oxide and oxyfluorides. The resulting fused salt may then be used directly or in mixture with additional diluent alkali metal chlorides in electrolytic processes for the production of titanium metal. The fused salt bath filtration procedure is particularly valuable in the preparation of divalent titanium fluorides, or mixtures of divalent and trivalent titanium fluorides. Divalent titanium fluoride is not generally amenable to aqueous treatment due to the strong reducing properties of divalent titanium salts. Heavy losses in yield can be expected even in highly buffered solutions. Accordingly it is preferable to recover the titanium difluoride containing product in the form of a fused salt bath in which the divalent titanium is present either in simple or complex difluoride compounds.

The titanium difluoride and trifluoride products of the process are useful for a variety of purposes including commercially important processes for the preparation of titanium metal.

The following examples are illustrative but not limitative of the practice of my invention:

*Example I*

A mixture was formed of pure titanium monoxide and recrystallized potassium fluotitanate in the proportion of one mol to one mol, that is, 1 part by weight of —325 mesh (Tyler Standard) titanium monoxide to 3.76 parts of crystalline potassium fluotitanate. The mixture was placed in graphite crucible and heated to a temperature of between 970° C. and 980° C. in an inert atmosphere furnace, in which a continuously changing argon atmosphere had been established. The reaction temperature was maintained for approximately three hours, whereupon the furnace was permitted to cool. The charge was actually at a temperature above 800° C. for a total of 5 hours including the heating up and cooling down periods. The resulting salt product was a salt cake of a dark purplish color varying between purplish brown and purplish black. During the heating a pungent gas was evolved which contained fluorine.

The salt product was crushed and a representative sample was removed for further examination and analysis. The remainder of the salt product was dissolved in fused sodium chloride and electrolyzed in an inert atmosphere cell constructed as described in U. S. Patent 2,707,170. There resulted a cathode deposit of titanium metal of satisfactory commercial quality.

The salt product preserved for examination and analysis was found to contain over 25% titanium and was found to be free of any unreacted titanium monoxide. The initial titanium content of the $K_2TiF_6$ was about 20%. Thus the titanium content of the product is indicative of conversion to the compound $KTiF_3$ (Equation 8).

It will be understood that any unreacted starting materials can be separated and recycled if desired and that the salt products may be processed to recover the several constituents separately, as described in copending application Serial No. 455,068 now United States Patent 2,723,182.

I claim:

1. The method of producing alkali-metal-titanium double fluorides in which the titanium has a valence of less than four which comprises: forming a charge consisting essentially of (1) an alkali-metal-titanium fluoride in which the titanium is tetravalent and (2) an oxide of titanium in which the titanium has a valence of less than four, in which the relative proportions of said alkali-metal titanium double fluoride and said titanium oxide are such as to provide at least one atom of lower valent titanium as oxide for each two atoms of tetravalent titanium as double fluoride; heating the charge to a temperature sufficient to melt at least one of said charge constituents and within the range of 700° C. to 1150° C. under an atmosphere inert with respect to said reactants, and recovering from the reaction mass at least one resulting alkali-metal double fluoride in which the titanium has a valence of less than four.

2. The method of producing alkali-metal-titanium double fluorides in which the titanium has a valence of three which comprises: forming a charge consisting essentially of (1) an alkali-metal-titanium fluoride in which the titanium is tetravalent and (2) an oxide of titanium in which the titanium has a valence of less than four in which the relative proportions of said alkali-metal-titanium double fluoride and said titanium oxide are such as to provide at least one atom of lower valent titanium as oxide for each two atoms of tetravalent titanium as double fluoride, heating the charge to a temperature sufficient to melt at least one of said charge constituents and within the range of 700° C. to 900° C. under an atmosphere inert with respect to said reactants, and recovering from the reaction mass at least one resulting alkali-metal double fluoride in which the titanium has a valence of three.

3. The method of producing alkali-metal-titanium double fluorides in which the titanium has a valence of two which comprises: forming a charge consisting essentially of (1) an alkali-metal-titanium fluoride in which the titanium is tetravalent and (2) an oxide of titanium in which the titanium has a valence of less than four in which the relative proportions of said alkali-metal-titanium double fluoride and said titanium oxide are such as to provide at least one atom of lower valent titanium as oxide for each two atoms of tetravalent titanium as double fluoride, heating the charge to a temperature sufficient to melt at least one of said charge constituents and within the range of 900° C. to 1150° C. under an atmosphere inert with respect to said reactants, and recovering from the reaction mass at least one resulting alkali-metal-double fluoride in which the titanium has a valence of two.

4. The method of producing alkali metal titanium double fluorides in which the titanium has a valence less than four which comprises: forming a charge consisting of an alkali metal titanium double fluoride in which the titanium is tetravalent and titanium monoxide, the molar proportion of titanium monoxide to the alkali metal double fluoride in said charge being at least 1:2, heating the charge to a temperature within the range 700° C. to 1150° C. under an atmosphere inert with respect to said reactants and recovering from the reaction mass at least one resulting alkali metal titanium double fluoride in which the titanium has a valence of less than four.

5. The method of producing alkali metal titanium double fluorides in which the titanium has a valence less than four which comprises: forming a charge consisting of an alkali metal titanium double fluoride in which the titanium is tetravalent and titanium sesquioxide, the molar proportion of titanium sesquioxide to the alkali metal double fluoride in said charge being at least 1:4, heating the charge to a temperature within the range 700° C. to 1150° C. under an atmosphere inert with respect to said reactants and recovering from the reaction mass at least one resulting alkali metal titanium double fluoride in which the titanium has a valence of less than four.

References Cited in the file of this patent

UNITED STATES PATENTS

| | | |
|---|---|---|
| 2,718,464 | Gross et al. | Sept. 20, 1955 |
| 2,723,182 | Sibert et al. | Nov. 8, 1955 |